B. J. DIEHL.
SAFETY GAS COCK.
APPLICATION FILED APR. 5, 1919.

1,335,666.

Patented Mar. 30, 1920.

WITNESSES

INVENTOR
BENJAMIN JOSEPH DIEHL
BY
ATTORNEYS

UNITED STATES PATENT OFFICE.

BENJAMIN JOSEPH DIEHL, OF NEW YORK, N. Y.

SAFETY GAS-COCK.

1,335,666.                Specification of Letters Patent.    Patented Mar. 30, 1920.

Application filed April 5, 1919. Serial No. 287,878.

*To all whom it may concern:*

Be it known that I, BENJAMIN J. DIEHL, a citizen of the United States, and a resident of the city of New York, Glendale, borough of Queens, in the county of Queens and State of New York, have invented a new and Improved Safety Gas-Cock, of which the following is a full, clear, and exact description.

This invention relates to a gas cock, and aims to provide a device of this nature wherein the acccidental displacing of the conventional rubber tube from the end of such cock will result in the automatic shutting off of the flow of fluid through such cock.

A further object of the invention is to provide a device of this nature wherein the flow of fluid is primarily controlled by means of a conventional turn valve but wherein the nozzle of the cock has applied to it a secondary valve which will automatically cut off the flow of fluid through such nozzle, should the tube receiving such fluid be accidentally pulled off.

Another object of the invention is to locate such secondary valve entirely on the outside of the nozzle, so that the same may be readily accessible.

Reference is had to the accompanying drawings which represent one practical embodiment of my invention, and in which—

Figure 1:
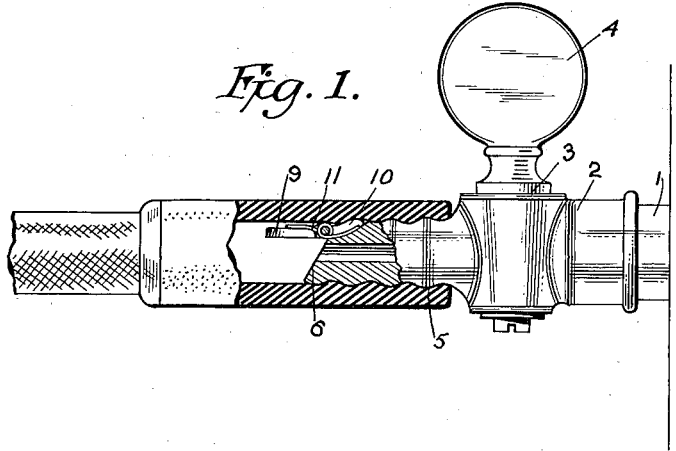
Figure 1 is a side elevation partly in section of a cock with the secondary valve in open position and the mouthpiece of a rubber tube applied to such cock.
Figure 2:
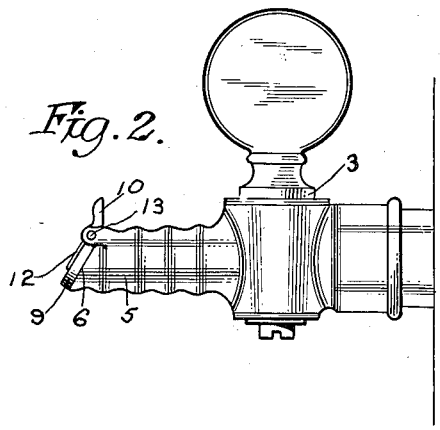
Fig. 2 is a side elevational view of the cock with the tube removed and the secondary valve closed.
Figure 3:
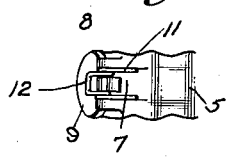
Fig. 3 is a plan view of the nozzle as illustrated in Fig. 2.

In these drawings 1 designates the conventional wall pipe, which is provided with a cock 2 including the usual turn valve 3 operated by means of a finger piece 4. The cock 2 is provided on the outside of said valve with a nozzle 5, the end of which is preferably inclined as indicated at 6 and recessed along its upper edge as shown at 7. Upon both sides of the recess 7 lugs 8 project; between which is hingedly mounted a cap 9 formed with an integral operating lug 10. The cap 9 is retained normally in closed position by means of a spring 11, which comprises a pair of legs joined together at their upper ends and bearing against the upper face of the cap, as indicated at 12, the portion intermediate their extremities being looped around the hinge 13 securing the cap 9 between the lugs 8.

In operation it will now be seen that upon a tube being applied to the nozzle 5 of the cock 2 the cap 9 will be swung outwardly, so as to permit an unrestricted flow of the fluid through the bore of the nozzle, by virtue of the fact that the inner face of the tube will engage the lug 10; and upon such tube being slid upon the nozzle 5 the lug 10 will be swung rearwardly and downwardly, simultaneously raising the cap 9 from out of engagement with the inclined face 6 until the lug 10 lies in the recess 7, at which position the cap 9 will be in the position indicated in Fig. 1.

Should now the tube become accidentally displaced with the valve 3 open and the fluid ejecting from the nozzle 5, the tube will, of course, disengage the lug 10 and permit the spring 11 to swing the cap 9 firmly into engagement with the inclined face 6 of the nozzle 5 and effectually prevent the escape of any further fluid from such nozzle.

The value of this invention will readily be appreciated, in view of the great number of fatalities which occur every year caused by a piece of tubing becoming disconnected from a cock and permitting, without the knowledge of the occupants of the room, the escape of gas into the room with very serious consequences.

It will be further appreciated that the seating of the cap 9 against the inclined face 6 of the nozzle 5 will be such that no escape of fluid can take place, for the reason that the pressure in a gas system is very slight and, further, by reason of the fact that the bore of the nozzle 5 is comparatively small and the pressure of the fluid therein could, hence, not exert very great force against the action of the spring 11.

Having thus described my invention, I claim as new and desire to secure by Letters Patent:

1. A gas cock, including a nozzle, a pair of lugs integral with and extending beyond the upper end of such nozzle, and a cap hingedly mounted between such lugs and being adapted to close such end.

2. A gas cock, including a nozzle provided with a recess in its uppermost portion, a pair of lugs integral with such nozzle and projecting outwardly one upon each side of said recess, a cap hingedly mounted between such lugs, and a lug integral with such cap and extending beyond the point of hinging, the recess being adapted to receive the lug when the cap is in open position.

BENJAMIN JOSEPH DIEHL.